United States Patent
Yu et al.

(10) Patent No.: US 7,988,442 B2
(45) Date of Patent: Aug. 2, 2011

(54) VACUUM MOLD AND DEVICE FOR DRILLING EXTRACTION HOLES THEREIN

(75) Inventors: Jiang Yu, Shenzhen (CN); Jian-Bin Deng, Shenzhen (CN); Yi Zhao, Shenzhen (CN); Bo Liu, Shenzhen (CN); Shao-Hui Zhang, Shenzhen (CN); Qing-Ming Yuan, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 201 days.

(21) Appl. No.: 12/344,655

(22) Filed: Dec. 29, 2008

(65) Prior Publication Data
US 2010/0003092 A1    Jan. 7, 2010

(30) Foreign Application Priority Data
Jul. 4, 2008  (CN) .......................... 2008 1 0302546

(51) Int. Cl.
*B29C 33/46*  (2006.01)

(52) U.S. Cl. .................. 425/388; 425/405.1; 425/812; 425/DIG. 102

(58) Field of Classification Search .............. 425/388, 425/812, 383, 437, 422, 556, 405.1, DIG. 102
See application file for complete search history.

(56) References Cited

U.S. PATENT DOCUMENTS

| | | | | |
|---|---|---|---|---|
| 3,577,593 | A * | 5/1971 | Jackson | 425/388 |
| 4,740,145 | A * | 4/1988 | Shurman | 425/812 |
| 6,524,519 | B1 * | 2/2003 | Ohba et al. | 425/812 |
| 6,749,794 | B2 | 6/2004 | Spengler | |
| 6,887,066 | B2 * | 5/2005 | Cerny et al. | 425/556 |

* cited by examiner

*Primary Examiner* — Robert B Davis
*Assistant Examiner* — Thu Khanh T Nguyen
(74) *Attorney, Agent, or Firm* — Clifford O. Chi

(57) ABSTRACT

A vacuum mold includes a mold body with a molding surface. The mold body defines a plurality of extraction holes. Each extraction hole includes a first hole portion, a second hole portion, and a connecting portion connecting the first hole portion and second hole portion. The first hole portion is adjacent to the molding surface, and a diameter of the first hole portion is smaller than a diameter of the second hole portion.

4 Claims, 2 Drawing Sheets

VACUUM MOLD AND DEVICE FOR DRILLING EXTRACTION HOLES THEREIN

BACKGROUND

1. Technical Field

The present disclosure relates to a vacuum mold and device for drilling extraction holes therein.

2. Description of the Related Art

Generally, common plastic molding includes vacuum molding, injection molding, extrusion molding, compression molding, and blow molding. Vacuum molding is widely used in various industries because of its low cost.

In a typical vacuum molding process, a resin sheet is first positioned on a molding surface of a mold body. The resin sheet is then heated to become soft until the resin sheet deforms into a predetermined shape corresponding to a shape of the molding surface and abuts the molding surface. Gas is vented through the extraction holes to form a vacuum between the deformed resin sheet and the mold body, thereby pulling the deformed soft resin sheet to the molding surface. The deformed resin sheet is then cooled to form the predetermined shape. Finally, compressed gas is injected into the extraction holes to push the molded sheet away from the molding surface.

However, if the extraction holes have too large a diameter, the material of the resin sheet flows into the extraction holes and forms micro-protrusions after cooling. If each extraction hole has too small a diameter and too large a depth, venting the gas in the extraction holes is difficult. As a result, it becomes difficult to pull the resin sheet and difficult to generate a force to push the molded sheet away from the molding surface, resulting in a low yield rate.

Therefore, a vacuum mold and a device for drilling extraction holes in the vacuum mold is desired to overcome the above-described shortcoming.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
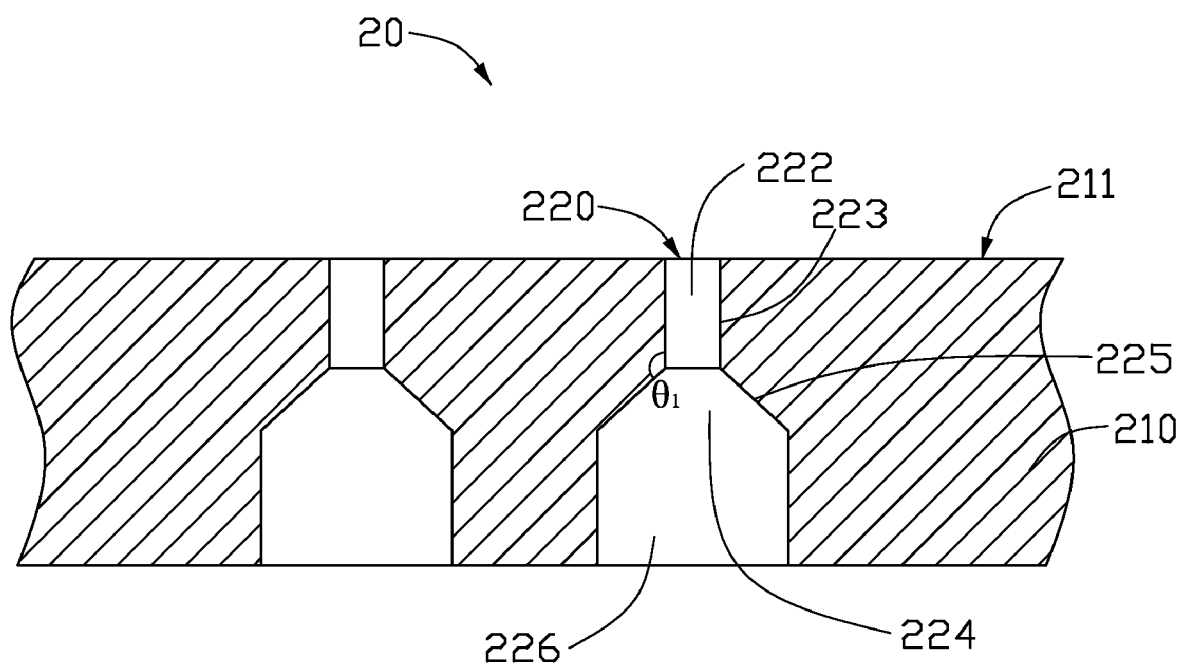
FIG. 1 is a partial, cross-sectional view of one embodiment of a vacuum mold.

Referring to FIG. 1, one embodiment of a vacuum mold 20 includes a mold body 210 having a molding surface 211 to resist a resin sheet for molding. The mold body 210 defines a plurality of extraction holes 220. Each extraction hole 220 includes a first hole portion 222, a connecting portion 224, and a second hole portion 226. The connecting portion 224 connects the first hole portion 222 and the second hole portion 226. The first hole portion 222 is adjacent to the molding surface 211. A diameter of the first hole portion 222 is smaller than a diameter of the second hole portion 226.

The first hole portion 222 may be substantially cylindrical, ellipsoidal, or polygonal. If the first hole portion 222 is substantially cylindrical, a maximum depth of the first hole portion 222 is about 5 millimeters (mm), and a maximum diameter of the first hole portion 222 is about 0.3 mm. The first hole portion 222 has a sufficiently sized depth so that the pressure drop is sufficient for a device to handle generating the vacuum force to pull the resin sheet against the molding surface 211 and generating a blowing force to push a molded product away from the molding surface 211.

The second hole portion 226 may be substantially cylindrical, ellipsoidal, or polygonal. When the second hole portion 226 is substantially cylindrical, a maximum diameter of the second hole portion 226 is about 0.8 mm. In the illustrated embodiment, the second hole portion 226 is substantially cylindrical, and the diameter of the second hole portion 226 is about 0.6 millimeters.

A shape of the connecting portion 224 corresponds to the shape of the first hole portion 222 and the shape of the second hole portion 226. For example, a shape of the connecting portion 224 may be frustoconical, oval frustum shaped, or a diamond-shaped taper, such as if the first hole portion 222 and the second hole portion 226 are polygonal. In the illustrated embodiment, the connecting portion 224 is frustoconical shaped. An inner surface 225 of the connecting portion 224 and an inner surface 223 of the first hole portion 222 defines an angle $\theta_1$. In the illustrated embodiment, the angle $\theta_1$ is about 126 degrees to about 136 degrees.

The diameter of the first hole portion 222 is smaller than the diameter of the second hole portion 222 so that a portion of a heated resin sheet is prevented from being sucked into the extraction holes, thereby avoiding the likelihood of micro-protrusions. Gas in the extraction holes can be vented out easily to generate a force to pull the resin sheet. Additionally, compressed gas is injectable into the second hole portion 222 and through the first hole portion 222 easily, thereby generating a force large enough to push the molded product made from the resin sheet. Therefore, a production rate is enhanced.

Figure 2:
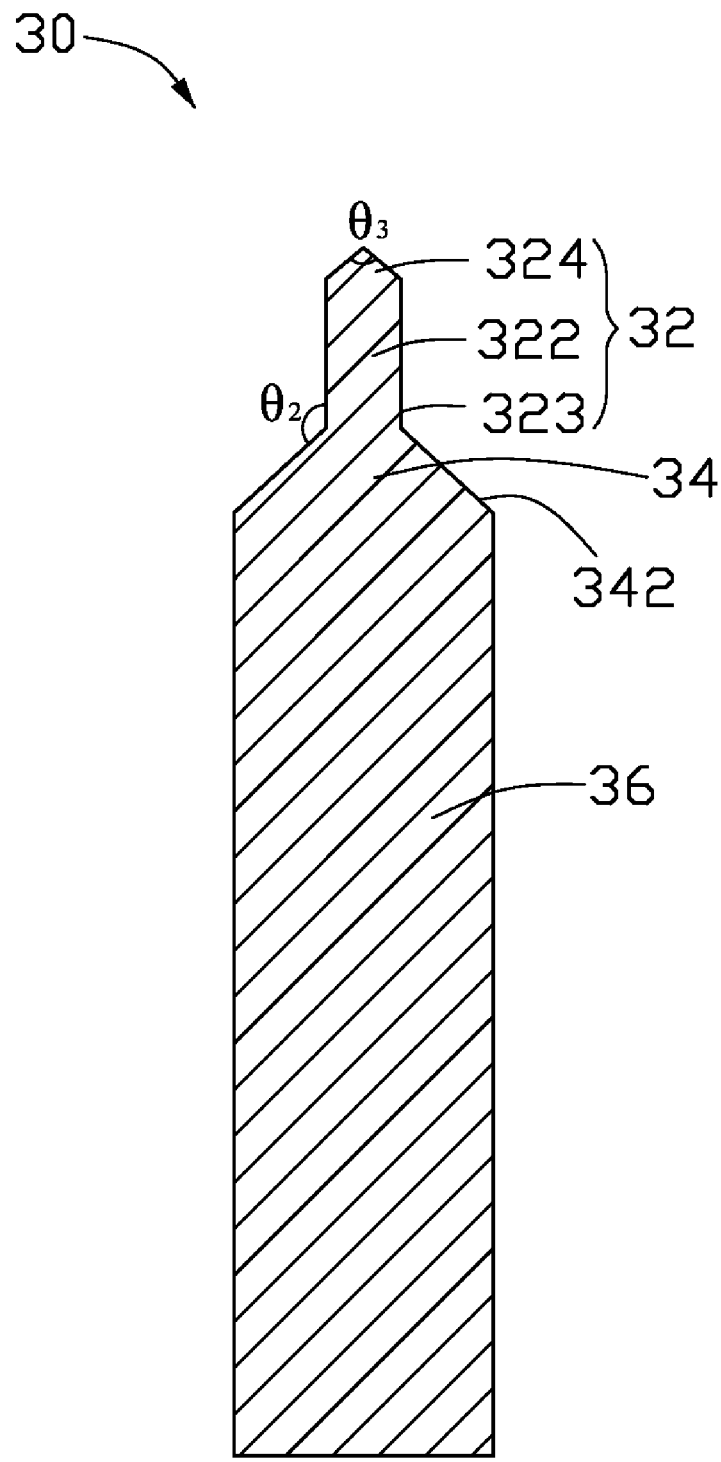
FIG. 2 is a cross-sectional view of one embodiment of a device for drilling an extraction hole in the vacuum mold in FIG. 1.

Referring to FIG. 2, a drilling device 30 for drilling an extraction hole 220 of the vacuum mold 20 is shown. The drilling device 30 includes a pinhead 32, a main body 36, and a connecting portion 34 connecting the pinhead 32 and the main body 36.

The pinhead 32 includes a rod portion 322 and a head portion 324. A first end of the rod portion 322 connects the connecting portion 34 and a second end opposite to the first end connects head portion 324. A diameter of the rod portion 322 is smaller than a diameter of the main body 36. The rod portion 322 may be substantially cylindrical, ellipsoidal, or polygonal. A maximum diameter of the rod portion 322 is about 0.3 mm. A shape of the head portion 324 may be conical shaped, elliptic-conical shaped, or polygonal pyramidal shaped. In the illustrated embodiment, the rod portion 322 is substantially cylindrical, and the diameter of the rod portion 322 is about 0.3 millimeters. A length of the rod portion 322 is about 5 mm. The head portion 324 is conical shaped, and a conical angle $\theta_3$ of the head portion 324 is about 120 degrees.

The main body 36 may be substantially cylindrical, ellipsoidal, or polygonal. If the main body 36 is substantially cylindrical, a maximum diameter of the main body 36 is about 0.8 mm. In the illustrated embodiment, the main body 36 is substantially cylindrical, and the diameter of the main body 36 is about 0.6 mm.

A shape of the connecting portion 34 corresponds to that of the pinhead 32 and the main body 36. For example, if the rod portion 322 and the main body 36 are polygonal, the connecting portion 34 is a diamond-shaped taper. In the illustrated embodiment, the connecting portion 34 is a frustoconical in shape. An outer surface 342 of the connecting portion 34 and an outer surface 323 of the pinhead 32 define an angle $\theta_2$. The angle $\theta_2$ is about 126 degrees to about 136 degrees.

In a process of forming extraction holes by the drilling device 30, the pinhead 32, when drilled into the mold body 210, forms the first hole portion 222 of one extraction hole 220. The main body 36, when drilled into the mold body 210, forms the second hole portion 226 of the extraction hole 220. The connecting portion 34, when drilled into the mold body 210, forms the connecting portion 224 of the extraction hole 220. Thus, each extraction hole 226 can be formed by the drilling device 30 simultaneously.

Finally, while various embodiments have been described and illustrated, the embodiments are not to be construed as being limited thereto. Various modifications can be made to the embodiments by those skilled in the art without departing from the true spirit and scope of the present disclosure as defined by the appended claims.

What is claimed is:

1. A vacuum mold, comprising a mold body having a molding surface for molding a resin sheet, the mold body defining a plurality of extraction holes, each extraction hole comprising a first hole portion adjacent to the molding surface, a second hole portion, and a connecting portion connecting the first hole portion and the second hole portion, a diameter of the first hole portion being smaller than a diameter of the second hole portion, wherein the first hole portion is configured to prevent the resin sheet from being sucked into the extraction hole and allow gas to be vented out from the second hole portion, and an inner surface of the connecting portion and an inner surface of the first hole portion cooperatively define an angle of about 126 degrees to about 136 degrees, the second hole portion is configured to allow compressed gas to enter therethrough to produce a force in the first hole portion.

2. The vacuum mold as claimed in claim 1, wherein the first hole portion is substantially cylindrical, ellipsoidal, or polygonal.

3. The vacuum mold as claimed in claim 1, wherein the second hole portion is substantially cylindrical, ellipsoidal, or polygonal.

4. The vacuum mold as claimed in claim 2 or 3, wherein the connecting portion is frustoconical shaped, oval frustum shaped, or a diamond-shaped taper, and the first hole portion, the connecting portion and the second hole portion is configured to be simultaneously formed.

* * * * *